C. W. GROOT.
WIND SHIELD CLEANER.
APPLICATION FILED OCT. 22, 1917.

1,293,759.

Patented Feb. 11, 1919.
2 SHEETS—SHEET 1.

Inventor
Charles W. Groot

By Mason Fenwick Lawrence,
Attorneys

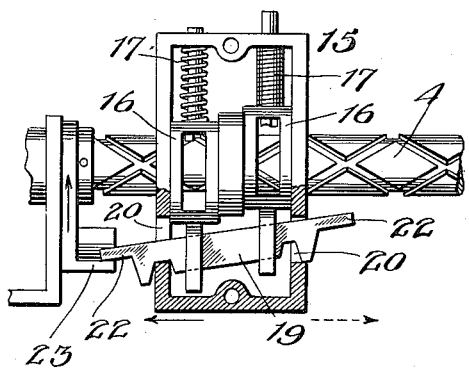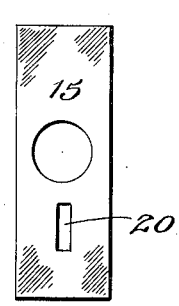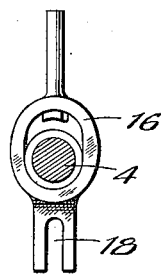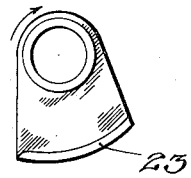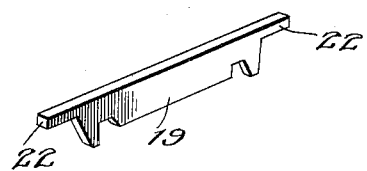

UNITED STATES PATENT OFFICE.

CHARLES WILLIAM GROOT, OF ROCHESTER, NEW YORK.

WIND-SHIELD CLEANER.

1,293,759.　　　　　Specification of Letters Patent.　　Patented Feb. 11, 1919.

Application filed October 22, 1917. Serial No. 197,923.

*To all whom it may concern:*

Be it known that I, CHARLES W. GROOT, a citizen of the United States, residing at Rochester, in the county of Monroe and State of New York, have invented certain new and useful Improvements in Wind-Shield Cleaners; and I do hereby declare the following to be a full, clear, and exact description of the invention, such as will enable others skilled in the art to which it appertains to make and use the same.

This invention relates to window cleaning devices and more particularly to a device for cleaning wind shields of vehicles.

It is one of the objects of the present invention to provide an improved window cleaning device which may be operated automatically through means of suitable driving connections between a running or operating part of the vehicle and a mechanism carrying and controlling the operation of a wiper.

A further object of the invention is to provide improvements in a wiper or cleaner which may be manually controlled and automatically operated through power derived from the operating plant of an automobile or other self-propelled vehicle.

Another object of the present invention is to provide a simple, practical, reliable and inexpensive construction.

With these and other objects in view as will be rendered manifest in the following specification to those skilled in the art, the invention consists in the whole, construction, and in the details of the combination as more fully described hereinafter, relative to the form of the invention illustrated in the accompanying drawings, in which:—

Figure 1:
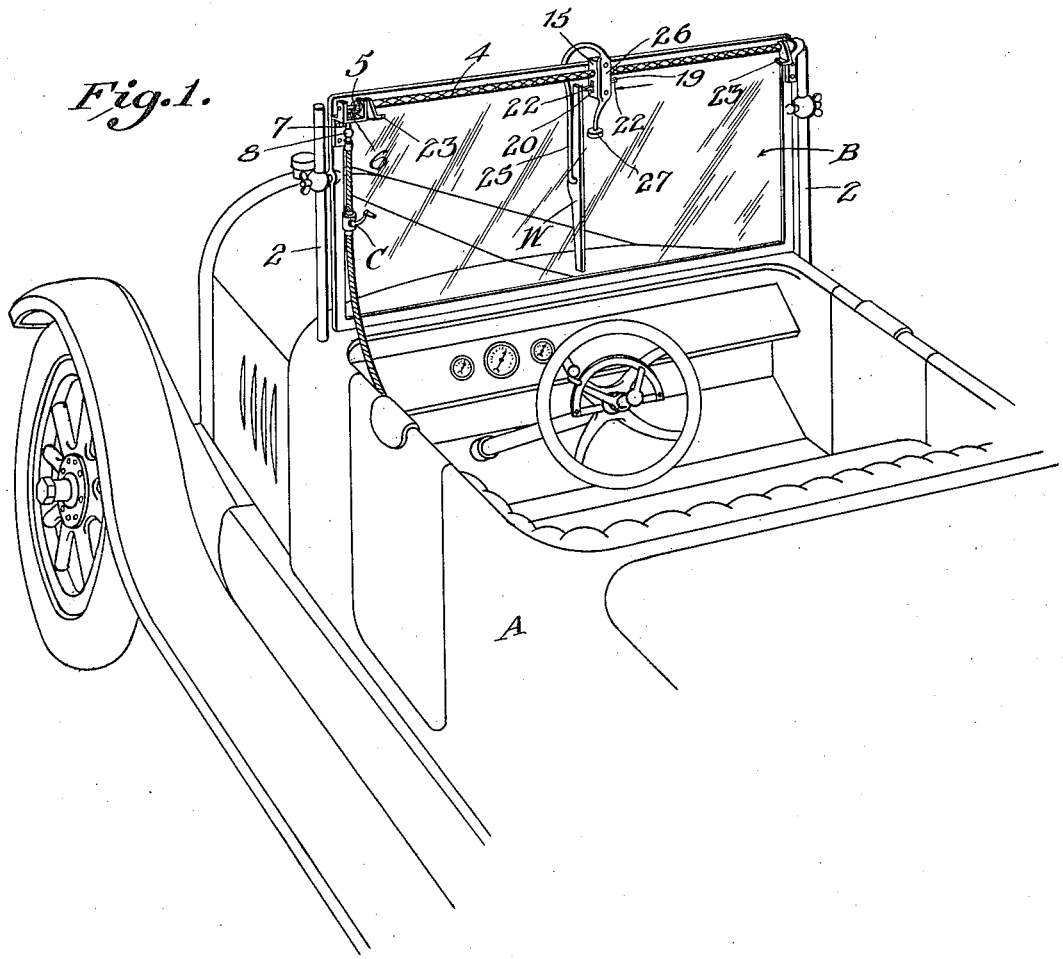
Figure 2:
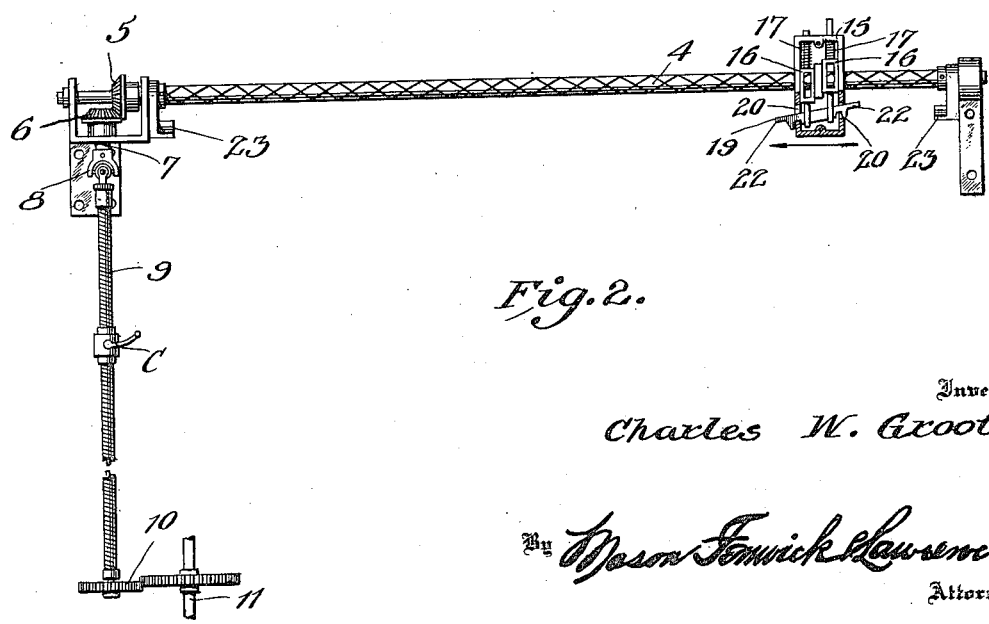

Figure 1 is a perspective view of the front portion of an automobile showing the device applied, Fig. 2 is a side elevation in detail of the mechanism for operating the wiper, Fig. 3 is an enlarged detail view of the carriage, Fig. 4 is an end elevation of the carriage shown in Fig. 3, Fig. 5 is a side elevation of one of the screw engaging dogs, Fig. 6 is a side elevation of one of the operating cams, and Fig. 7 is a perspective view of the controller or tripping device for the screw dogs.

While the window cleaning device contemplated in the above invention is adaptable for a variety of windows or shields in different organizations, it is illustrated herein as applied to the wind-shield of an automobile A, the window-shield B being adjustably mounted upon suitable uprights 2 and to these are connected appropriate bearings shown as arranged on the rear side of the shield and in which is rotatably mounted a double-threaded screw 4 having at one end a beveled gear 5 meshing with a complementary gear 6 which latter is secured upon a stub shaft 7 universally jointed at 8 to a flexible shaft 9. One end of this flexible shaft 9 is adapted to be connected by any suitable driving means or driving instruments to the front wheel of the vehicle on which the shield may be mounted or may be driven by suitable connection indicated at 10, Fig. 2, to a portion of driven mechanism indicated at 11 of the vehicle. At any suitable point between the gear mechanism for driving the screw and the element of the vehicle which is utilized to drive the mechanism, there may be introduced a controlling clutch indicated generally at C, whereby the operation of the screw may be manually controlled at will, so that only as the occasion may require, will the screw be operated. Upon the screw there is mounted a suitable form of frame or carriage 15 through the sides of which the screw 4 passes, between which sides of the frame and guided thereon are disposed a pair of dogs or screw thread engaging members 16 having pins at their upper ends surrounded by springs 17, the lower portion of the dogs being slotted as at 18 to straddle a controller or reversing lever 19 supported in the lower portion of the slide or carriage 15 and projecting through slots 20 in the walls thereof. The controller 19 is shown in Fig. 7 as provided on its lower surface or edge with a pair of notches 21 which are spaced between their centers a distance slightly less than the distance between the side walls of the carriage 15 so that the lever 19 is adapted to rest in alternately inclined positions upon one edge or the other at the bottom of the slot 20 as shown in Fig. 2 in which position one of the dogs or screw engaging devices 16 which are provided with central elongated apertures to permit the passage of the screw and allow for up or down movement of the dogs on the screw, may be lifted or levered so that the dogs alternately engage respective screw threads.

To secure the automatic action of the carriage back and forth across the screw, the reversing lever is provided with tongues 22 at its ends adapted as they approach the ends of the screw 4, to be lifted from their lower position to an upper position by the action of suitable means, comprising herein internal cams 23 secured on the ends of the screw rod. When the lower end of the lever 19 is engaged by its respective cam passing thereunder the lever is raised to a horizontal position and slips off the bottom wall of the slot 20 at the opposite side of the carriage, endwise movement of the lever causing its notch 21 at the end opposite to that lifted by the cam, to pass into register with the bottom of the adjacent slot 20 whereupon the lever tips downward at that end while its opposite end rests in an elevated position in its slot. The tongues 22 when in their lower position are designed to move into the paths of the cams and ride up the concave faces thereof as the cams rotate. During this action the dog engaging the screw is lifted against its spring while the other dog is released and pressed down by its spring so that it engages the reverse threads and causes a reverse movement of the carriage.

The wiping of the window or wind-shield is secured by means of a wiper W bearing upon one side of the wind-shield and connected to a yielding arm 25 which is secured at 26 to the carriage 15. In the illustrated form of the invention, the carriage may have a slight rocking movement on the screw 4 and the wiper is held with suitable friction against the surface of the window or shield B owing to the resiliency of the arm 25, the opposite end of which is shown as provided with a runner or wheel 27 bearing on the opposite side of the wind-shield than that engaged by the wiper W.

From the foregoing it will be seen that I have provided a wind-shield wiping device practically entirely carried by a suitable wind-shield so that the latter may be positioned at any angle without interference of the wiping device, the changes in the angular disposition of the wind-shield being provided for by means of the flexible connection for operating the shaft 9. When the device is connected up to a driven part of the vehicle, it is only necessary for the operator, if he desires to have the shield wiped or cleaned, to throw the clutch C so as to couple the transmitting mechanism to the shaft 4 and so long as the latter is rotating, the carriage 15 will be reciprocated back and forth and carry the wiper across the surface of the wind-shield, the reciprocations of the carriage being automatically controlled through the actuation by the cams of the controller or lever 19 which lifts or lowers the screw engaging dogs so that they are alternately engaged with the shaft.

What is claimed as new is:

1. A device for cleaning wind-shields, windows or the like, comprising a rotatable double-threaded screw adapted to be mounted on a window frame, means for rotating the screw, a wiper carriage on the screw and a wiper carried thereby, dogs on the carriage for alternately engaging the screw, and automatic control means for the said dogs including cams carried at opposite ends of the screw.

2. A device for cleaning wind shields or other windows, comprising a rotatable double-threaded screw adapted to be mounted on a window frame and means for rotating the same, a carriage thereon, spaced screw-engaging means on said carriage, a device on the carriage for acuating said screw-engaging means, means on said screw for actuating said last named device, and a wiper secured to the carriage.

3. A device for cleaning window shields or other windows, comprising a rotatable double-threaded screw adapted to be mounted on a window frame and means for rotating the same, a carriage thereon, spring-pressed screw-engaging dogs on said carriage, a lever on the carriage for actuating said dogs, and means on said screw for actuating said lever, and a wiper secured to the carriage.

4. A rotatable double-threaded screw adapted to be mounted on a window frame, means for rotating it, a carriage, carrying a wiper, on the screw, dogs on said carriage for engaging respective threads of the screw, a lever concurrently reversing the positions of the dogs, and means on said screw for actuating said lever.

5. A rotatable double-threaded screw adapted to be mounted on a window frame, means for rotating it, a carriage, carrying a wiper, on the screw, dogs on said carriage for engaging respective threads of the screw, a controller mechanism operated by the screw for automatically actuating and reversing the dogs.

In testimony whereof I affix my signature.

CHARLES WILLIAM GROOT.